United States Patent
Fuse et al.

(10) Patent No.: US 6,981,136 B2
(45) Date of Patent: *Dec. 27, 2005

(54) EXTERNAL STORAGE APPARATUS HAVING REDUNDANT BOOT BLOCKS, AND DATA PROCESSING METHOD THEREFOR

(75) Inventors: Hiroaki Fuse, Kanagawa (JP); Akira Sassa, Saitama (JP)

(73) Assignee: Sony Corporation, Tokyo (JP)

(*) Notice: Subject to any disclaimer, the term of this patent is extended or adjusted under 35 U.S.C. 154(b) by 533 days.

This patent is subject to a terminal disclaimer.

(21) Appl. No.: 09/968,296

(22) Filed: Oct. 1, 2001

(65) Prior Publication Data

US 2004/0093487 A1    May 13, 2004

Related U.S. Application Data

(63) Continuation of application No. 09/162,332, filed on Sep. 28, 1998, now Pat. No. 6,330,634.

(30) Foreign Application Priority Data

Sep. 30, 1997 (JP) .................................. 9-267177

(51) Int. Cl.⁷ ............................................. G06F 12/00
(52) U.S. Cl. ................... 713/2; 713/1; 711/100; 711/104; 711/154
(58) Field of Search ................ 713/2, 1; 711/103, 711/100, 154, 104

(56) References Cited

U.S. PATENT DOCUMENTS

| 5,408,633 A | 4/1995 | Katsumura et al. ......... 395/425 |
| 5,522,076 A | 5/1996 | Dewa et al. .................... 713/2 |

(Continued)

FOREIGN PATENT DOCUMENTS

| EP | 0 596 198 | 5/1994 |
| EP | 0 619 541 | 10/1994 |

(Continued)

*Primary Examiner*—A. Elamin
(74) *Attorney, Agent, or Firm*—Frommer Lawrence & Haug LLP; William S. Frommer; Thomas F. Presson

(57) ABSTRACT

An external storage apparatus which incorporates a flash memory arranged to erase data in units of predetermined blocks and which is structured in such a manner that an error which is made when boot data is read is prevented. Boot data is stored in a plurality of different blocks. Moreover, an identification number indicating whether boot data stored in each of the blocks in which boot data has been stored is new or old is stored in each of the blocks. When the external storage apparatus is booted up, latest boot data among boot data stored in the plurality of the different blocks is read in accordance with the identification number. Latest boot data is used to boot the external storage apparatus up. When the external storage apparatus is booted up, whether boot data stored in the plurality of the different blocks is new or old is determined in accordance with the identification number. If old boot data exists, old boot data is rewritten to latest boot data.

9 Claims, 12 Drawing Sheets

U.S. PATENT DOCUMENTS

| | | | |
|---|---|---|---|
| 5,579,522 A * | 11/1996 | Christeson et al. | 713/2 |
| 5,701,492 A * | 12/1997 | Wadsworth et al. | 717/173 |
| 5,822,582 A | 10/1998 | Doragh et al. | 713/2 |
| 5,983,352 A | 11/1999 | Kong | 713/202 |
| 5,991,197 A | 11/1999 | Ogura et al. | 365/185.11 |
| 5,996,046 A * | 11/1999 | Yagisawa et al. | 711/114 |
| 6,205,548 B1 * | 3/2001 | Hasbun | 713/2 |
| 6,275,931 B1 * | 8/2001 | Narayanaswamy et al. | 713/2 |
| 6,330,634 B1 * | 12/2001 | Fuse et al. | 711/103 |
| 6,401,221 B1 * | 6/2002 | Sun et al. | 714/36 |
| 6,560,701 B1 * | 5/2003 | Berstis et al. | 713/2 |

FOREIGN PATENT DOCUMENTS

| | | |
|---|---|---|
| EP | 0 723 226 A1 | 7/1996 |
| EP | 0 738 954 | 10/1996 |
| GB | 2 295 908 | 6/1996 |
| WO | WO 94/01819 | 1/1994 |

* cited by examiner

EXTERNAL STORAGE APPARATUS HAVING REDUNDANT BOOT BLOCKS, AND DATA PROCESSING METHOD THEREFOR

RELATED APPLICATIONS

This is a continuation of U.S. patent application Ser. No. 09/162,332 filed on Sep. 28, 1998, which is now U.S. Pat. No. 6,330,634.

BACKGROUND OF THE INVENTION

1. Field of the Invention

The present invention relates to an external storage apparatus incorporating a storage means arranged to erase data in units of predetermined blocks and a data processing method for processing data which is stored in an external storage apparatus of the foregoing type.

2. Related Background Art

As external storage apparatuses of a type for use in a data processing apparatus, such as a personal computer or a digital still camera, external storage apparatuses of a type incorporating a so-called flash memory are known.

The external storage apparatus incorporating the flash memory has a structure that a storage region of the flash memory is divided into a plurality of blocks so as to manage a data region in block units. That is, erasing of data is performed in block units. If an unrecoverable error is made in the storage region, use of the block including the region in which the error has been made is inhibited. A block of the foregoing type is hereinafter called a use-inhibited block.

The external storage apparatus of the foregoing type has a structure that boot data containing information and so forth required to make an access to the external storage apparatus are previously stored in a predetermined block. When the external storage apparatus is booted up, boot data is initially read. Then, an access is made to the external storage apparatus in accordance with obtained boot data so that data is written/read.

In the external storage apparatus of the foregoing type, boot data usually contains information required to make an access to the external storage apparatus. If boot data cannot be read, the access to the external storage apparatus cannot be made. Therefore, boot data must have satisfactory reliability.

Hitherto, the block (hereinafter called a "boot block") in which boot data is stored is a block formed at a predetermined position. Even if a boot block which is usually used is made to be the use-inhibited block, a copy of boot data is stored in another block so that boot data is read. In the conventional external storage apparatus, the reliability is furthermore improved by preparing a plurality of copies of boot data. Moreover, the copies are stored in different blocks. However, the method in which the multiplicity of the copies of boot data are prepared is an undesirable method in a viewpoint of effectively using the storage capacity.

Hitherto, when boot data has been updated, whether or not all of the copies of boot data have been updated to latest boot data has not been determined. Therefore, if the copy of boot data is not correctly updated to latest boot data in a certain operation, latest, that is, correct boot data cannot be read. In the foregoing case, there is apprehension that a correct access to the external storage apparatus cannot be made.

Hitherto, even if a copy of boot data is prepared, the copy is used only when reading of boot data of the original fails. Therefore, if the contents of original boot data are made to be incorrect because, for example, bits in a portion of the boot block in which original boot data has been stored are undesirably inverted, there arises a problem in that the foregoing boot data is as it is used if foregoing boot data can be read.

SUMMARY OF THE INVENTION

In view of the foregoing, an object of the present invention is to provide an external storage apparatus which is capable of effectively using a storage region thereof, with which an error cannot easily be made when boot data is read and which exhibits satisfactory reliability.

Another object of the present invention is to provide a data processing method with which the foregoing external storage apparatus can be realized.

According to one aspect of the present invention, there is provided an external storage apparatus which is arranged to erase data in units of predetermined blocks and which incorporates a block in which boot data which is first read when the external storage apparatus is booted up is stored. Boot data is stored in each of the blocks in which boot data has been stored. Moreover, an identification number indicating whether boot data stored in each block in which boot data has been stored is new or old is stored in each of the blocks.

The external storage apparatus according to the program is booted up such that latest boot data among boot data stored in the plurality of the different blocks is read in accordance with the identification number. Then, latest boot data is used so that the external storage apparatus is booted up.

The external storage apparatus according to the present invention is arranged such that whether boot data stored in the plurality of the different blocks is new or old is determined in accordance with the identification number when the external storage apparatus is booted up. If old boot data exists, old boot data is rewritten to latest boot data.

According to another aspect of the present invention, there is provided a data processing method with which boot data which is first read when an external storage apparatus arranged to erase data in units of predetermined blocks is booted up is stored in the external storage apparatus, the data processing method comprising the steps of: storing boot data in each of a plurality of different blocks; and storing an identification number which indicates whether boot data stored in the blocks is new or old in each of the blocks in which boot data has been stored.

The data processing method according to the present invention has a structure that when the external storage apparatus is booted up, latest boot data among boot data stored in the plurality of the different blocks is read in accordance with the identification number, and the external storage apparatus is booted up by using latest boot data.

The data processing method according to the present invention has a structure that when the external storage apparatus is booted up, whether boot data stored in the plurality of the different blocks is new or old is determined in accordance with the identification number, and old boot data is rewritten to latest boot data when old boot data exists.

Other objects, features and advantages of the invention will be evident from the following detailed description of the preferred embodiments described in conjunction with the attached drawings.

DESCRIPTION OF THE PREFERRED EMBODIMENTS

An embodiment of the present invention will now be described with reference to the drawings.

Figure 1:
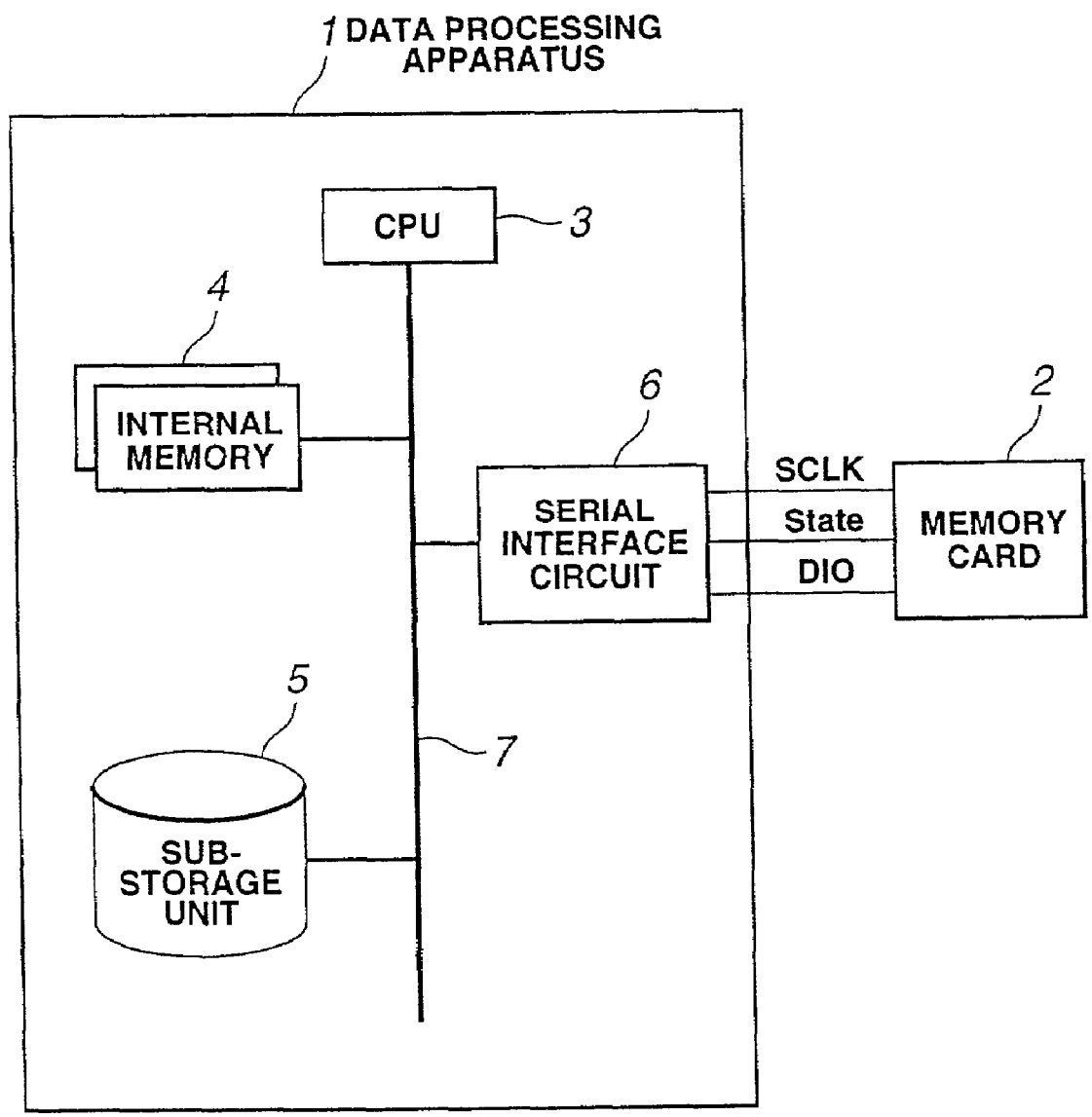
FIG. 1 is a diagram showing the overall structure of a system to which the present invention is applied.

FIG. 1 shows the overall structure of an example of a system to which the present invention is applied. The system according to this embodiment incorporates a data processing apparatus 1 which is a host system and a memory card 2 which is an external storage apparatus connected to the data processing apparatus 1 through a serial interface.

Although the system will now be described which has a structure that data is communicated between the data processing apparatus 1 and the memory card 2 through the serial interface, the present invention may be applied to a system of a type in which data communication is performed through a parallel interface.

The data processing apparatus 1 incorporates a central processing unit (CPU) 3, an internal memory 4, a sub-storage unit 5 and a serial interface circuit 6. The foregoing elements are connected to one another through a bus 7. The data processing apparatus 1 reads a program stored in, for example, the sub-storage unit 5 to cause the CPU 3 to execute the program by using the internal memory 4 as a work area. At this time, data is communicated to the memory card 2 through the serial interface circuit 6, as necessary.

The data processing apparatus for use in the system according to the present invention is not limited particularly if the data processing apparatus is able to communicate data to the external storage apparatus. The present invention may be applied to any one of a variety of data processing apparatuses, such as personal computers, digital still cameras and digital video cameras.

The data processing apparatus 1 and the memory card 2 are connected to each other through the serial interface. Specifically, the connection is established through three data lines, which are data lines SCLK, State and DIO. That is, the data processing apparatus 1 and the memory card 2 are connected to each other through at least the first data line SCLK for transferring a clock signal when data is transferred, the second data line State for transferring a status signal which is required when the data transfer is performed and the third data line DIO for serially transferring data which must be written on the memory card 2 or data and so forth read from the memory card 2. Thus, data is communicated between the data processing apparatus 1 and the memory card 2 through the foregoing data lines.

Data is usually communicated between the data processing apparatus 1 and the memory card 2 in file units, each of which is composed of a header and actual data. Note that, for example, information for making an access to the file, information required by the program which is executed by the data processing apparatus 1 and so forth are stored in the header of the file.

Figure 2:
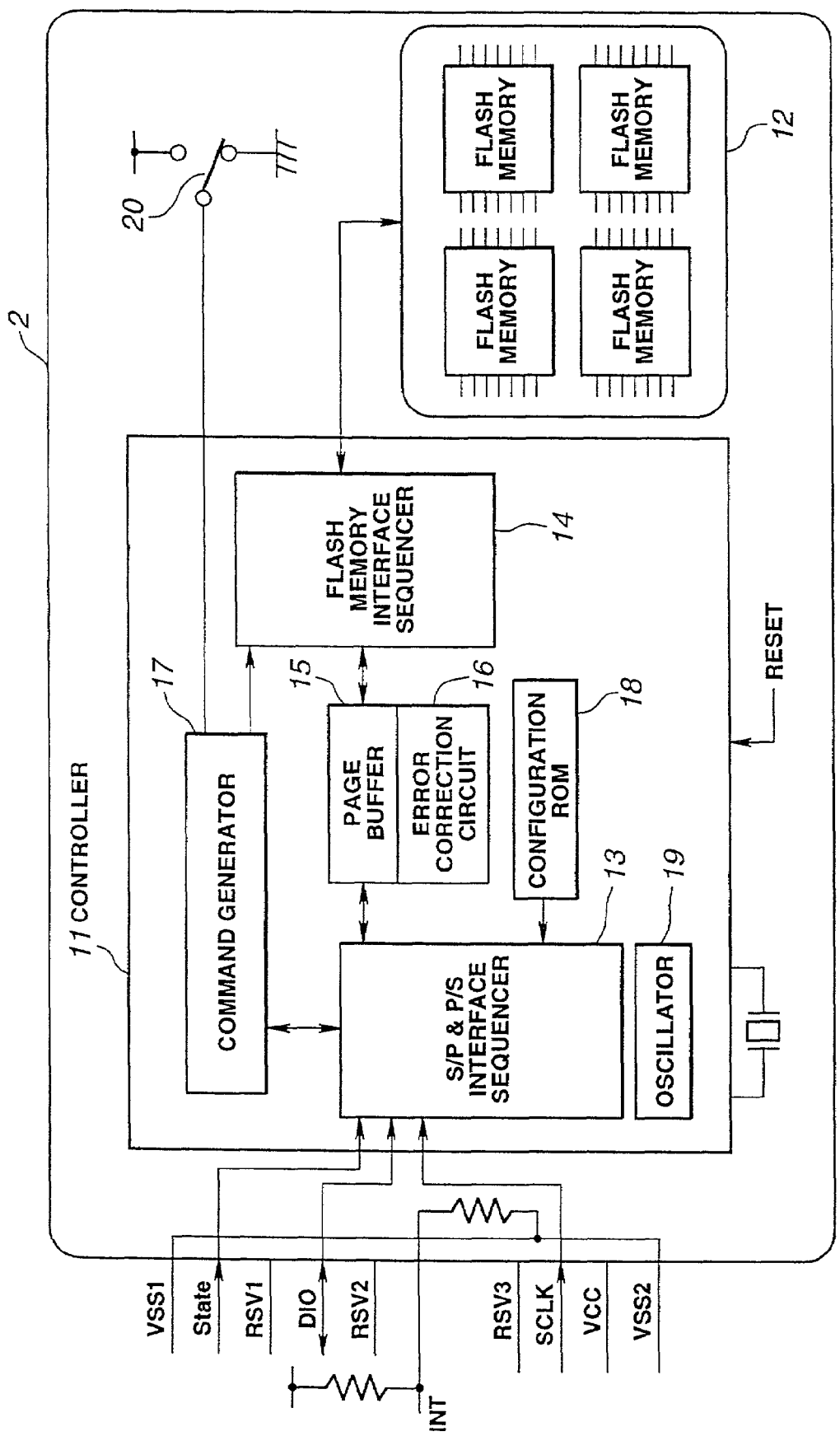
FIG. 2 is a block diagram showing the structure of a memory card to which the present invention is applied.

As shown in FIG. 2, the memory card 2 incorporates a controller 11, which comprises a so-called control IC, and a flash memory 12 which is controlled by the controller 11.

The controller 11 incorporates a serial/parallel and parallel/serial interface sequencer 13 (hereinafter called a S/P & P/S interface sequencer 13) for performing serial/parallel conversion and parallel/serial conversion; a flash memory interface sequencer 14 serving as an interface through which an access to the flash memory 12 can be made; a page buffer 15 for temporarily storing data which is communicated between the S/P & P/S interface sequencer 13 and the flash memory interface sequencer 14; an error correction circuit 16 for performing an error correction process; a command generator 17 for performing, for example, generation of a control command for controlling the access to the flash memory 12; a configuration ROM 18 in which version information of the memory card 2, various attribute information items and the like are stored; and an oscillator 19 for supplying a clock signal required for the operation of each of the above-mentioned circuits.

The S/P & P/S interface sequencer 13 is connected to the serial interface circuit 6 of the data processing apparatus 1 through the above-mentioned three data lines SCLK, State and DIO. Thus, the S/P & P/S interface sequencer 13 communicates data to the data processing apparatus 1 through the foregoing data lines SCLK, State and DIO. That is, the S/P & P/S interface sequencer 13 converts parallel data transmitted from the page buffer 15 into serial data so as to transmit serial data above to the serial interface circuit 6 of the data processing apparatus 1. The S/P & P/S interface sequencer 13 converts serial data transmitted from the serial interface circuit 6 of the data processing apparatus 1 into parallel data so as to transmit parallel data above to the page buffer 15.

Serial communication of data between the S/P & P/S interface sequencer 13 and the data processing apparatus 1 is performed through the third data line DIO while synchronization is maintained in response to the clock signal supplied from the data processing apparatus 1 through the first data line SCLK. The type of serial data which is communicated through the third data line DIO is determined in accordance with the status signal which is transferred through the second data line State. Serial data is classified into, for example, data which must be written on the flash memory 12, data read from the flash memory 12, control data for controlling the operation of the memory card 2 and the like. The status signal is also used to indicate the state of the memory card 2. The states of the memory card 2, which can be indicated in response to the status signal, includes a state in which data input to the memory card 2 from the data processing apparatus 1 is not permitted during a certain process; and a state in which data input from the data processing apparatus 1 is waited for after the process in the memory card 2 has been completed.

When data transmitted from the data processing apparatus 1 is control data for controlling the operation of the memory card 2, the S/P & P/S interface sequencer 13 supplies control data above to the command generator 17.

In accordance with control data supplied from the data processing apparatus 1 through the S/P & P/S interface sequencer 13, the command generator 17 generates a control command for controlling the access to the flash memory 12 so as to transmit the control command to the flash memory interface sequencer 14. As described later, the flash memory interface sequencer 14 writes data on the flash memory 12 and reads data from the flash memory 12 in accordance with the control command.

An erroneous erase preventive switch 20 is connected to the command generator 17. When the erroneous erase preventive switch 20 has been switched on, the command generator 17 does not generate a control command for erasing data written on the flash memory 12 even if control data for instructing erasing of data written on the flash memory 12 is transferred from the data processing apparatus 1. That is, the memory card 2 can be brought to either of a state in which data stored in the flash memory 12 cannot be erased by dint of the erroneous erase preventive switch 20 or a state in which data stored in the flash memory 12 can be erased.

The page buffer 15 disposed between the S/P & P/S interface sequencer 13 and the flash memory interface sequencer 14 is a so-called a buffer memory so as to temporarily store data which is communicated between the S/P & P/S interface sequencer 13 and the flash memory interface sequencer 14.

Data which is transmitted from the SIP & P/S interface sequencer 13 to the flash memory interface sequencer 14 is initially transmitted from the S/P & P/S interface sequencer 13 to the page buffer 15 so as to temporarily be stored in the page buffer 15. Data stored in the page buffer 15 is provided with an error correction code by an error correction circuit 16. Data provided with the error correction code is, in a predetermined page unit (for example, one page=512 bytes), transmitted from the page buffer 15 to the flash memory interface sequencer 14.

As an alternative to this, data transmitted from the flash memory interface sequencer 14 to the S/P & P/S interface sequencer 13 is initially transmitted from the flash memory interface sequencer 14 to the page buffer 15 so as to temporarily be stored in the page buffer 15. At this time, data stored in the page buffer 15 is subjected to an error correction process in the error correction circuit 16. Data subjected to the error correction process is, in a predetermined page unit, transmitted from the page buffer 15 to the S/P & P/S interface sequencer 13.

In accordance with the control command supplied from the command generator 17, the flash memory interface sequencer 14 performs writing of data on the flash memory 12, reading of data from the flash memory 12 and so forth. That is, the flash memory interface sequencer 14 reads data from the flash memory 12 in accordance with the control command supplied from command generator 17 so as to transmit data above to the S/P & P/S interface sequencer 13 through the page buffer 15, as described above. As an alternative to this, the command generator 17 receives data supplied from the S/P & P/S interface sequencer 13 through the page buffer 15 in accordance with the control command supplied from the command generator 17 so as to write data above on the flash memory 12.

Version information of the memory card 2, various attitude information items and the like are stored in the configuration ROM 18. Information stored in the configuration ROM 18 is, as necessary, read by the command generator 17 through the S/P & P/S interface sequencer 13 so as to be used. That is, the command generator 17 reads information stored in the configuration ROM 18, as necessary. In accordance with information, the command generator 17 performs various settings relating to the memory card 2.

When data in the form of serial data which must be written on the flash memory 12 has been supplied to the memory card 2 from the data processing apparatus 1 through the three data lines SCLK, State and DIO, the S/P & P/S interface sequencer 13 initially converts serial data into parallel data so as to transmit parallel data above to the page buffer 15. The page buffer 15 temporarily stores data transmitted from the S/P & P/S interface sequencer 13. At this time, data stored in the page buffer 15 is provided with an error correction code by the error correction circuit 16. Data provided with the error correction code is, in a predetermined page unit, transmitted to the flash memory interface sequencer 14. In accordance with control command supplied from the command generator 17, the flash memory interface sequencer 14 writes data supplied from the page buffer 15 on the flash memory 12. As a result of the above-mentioned process, data transmitted from the data processing apparatus 1 is written on the flash memory 12.

When data is read from the memory card 2, data is initially read from the flash memory 12 by the flash memory interface sequencer 14 in accordance with the control command supplied from the command generator 17. The flash memory interface sequencer 14 transmits data read from the flash memory 12 to the page buffer 15. The page buffer 15 temporarily stores data supplied from the flash memory interface sequencer 14. At this time, data stored in the page buffer 15 is subjected to the error correction process in the error correction circuit 16. Data subjected to the error correction process is, in a predetermined page unit, transmitted to the S/P & P/S interface sequencer 13. The S/P & P/S interface sequencer 13 converts data supplied from the page buffer 15 into serial data, and then transmits serial data to the data processing apparatus 1 through the three data lines SCLK, State and DIO. As a result of the above-mentioned process, data read from the flash memory 12 is transmitted to the data processing apparatus 1.

When data is written or read, control data for controlling the communication of data is transmitted to the S/P & P/S interface sequencer 13 of the memory card 2 from the data processing apparatus 1 as well as data which must be written on the flash memory 12 or data read from the flash memory 12 is communicated. Control data above is transmitted from the S/P & P/S interface sequencer 13 to the command generator 17. In accordance with control data transmitted from the S/P & P/S interface sequencer 13, the command generator 17 generates a control command for controlling the access to the flash memory 12. The control command is supplied to the flash memory interface sequencer 14. In accordance with the control command, the flash memory interface sequencer 14 makes an access to the flash memory 12 so as to write or read data.

In addition to the three data lines SCLK, State and DIO, the memory card 2 may be provided with a power supply line and a reserve line which is not used in a usual state. For example, FIG. 2 and FIG. 3 to be described later show a structure in which four power supply electric lines VSS1, VSS2, VCC and INT and three reserve lines RSV1, RSV2 and RSV3 are provided for the memory card 2 in addition to the three data lines SCLK, State and DIO.

A schematic shape of the memory card 2 will now be described with reference to FIG. 3.

The memory card 2 comprises a card-shape case 21 made of synthetic resin or the like and having a rectangular planar shape and a small thickness; the controller 11; the flash memory 12; and the like accommodated in the case 21. The memory card 2 is loaded into the data processing apparatus 1 having a loading mechanism for loading the memory card 2 so that the memory card 2 is used.

A diagonal cut portion 22 is formed at the front end of the case 21 of the memory card 2. Moreover, ten recesses 23 are formed in the cut portion 22. The recesses 23 have external connection terminals arranged to be connected to connection terminals of the data processing apparatus when the memory card 2 is loaded into the loading unit of the data processing apparatus 1. That is, the memory card 2 has ten terminals 24a, 24b, 24c, 24d, 24e, 24f, 24g, 24h, 24i and 24j serving as external connection terminals. The foregoing external connection terminals consist of three data line terminals 24b, 24d and 24h, four power supply terminals 24a, 24f, 24i and 24j for the power source and three reserve terminals 24c, 24e and 24g.

An erroneous erase preventive member 25 is joined to the upper surface of the case 21 of the memory card 2. The erroneous erase preventive member 25 is engaged to the erroneous erase preventive switch 20 accommodated in the case 21. When the erroneous erase preventive member 25 is slid, the erroneous erase preventive switch 20 can be switched on/off.

The memory card 2 is provided with a first locking cut portion 26 having a circular arc shape and provided for either side surface of the erroneous erase preventive switch 20 to prevent separation of the memory card 2 from the data processing apparatus 1 after the memory card 2 has been loaded into the loading unit of the data processing apparatus 1. Moreover, a second locking cut portion 27 in the form of a rectangular shape is formed in another side surface of the erroneous erase preventive switch 20. When the memory card 2 has been loaded into the loading unit of the data processing apparatus 1, the locking cut portions 26 and 27 are engaged to the loading unit of the data processing apparatus 1 in order to prevent separation of the memory card 2.

Figure 3:
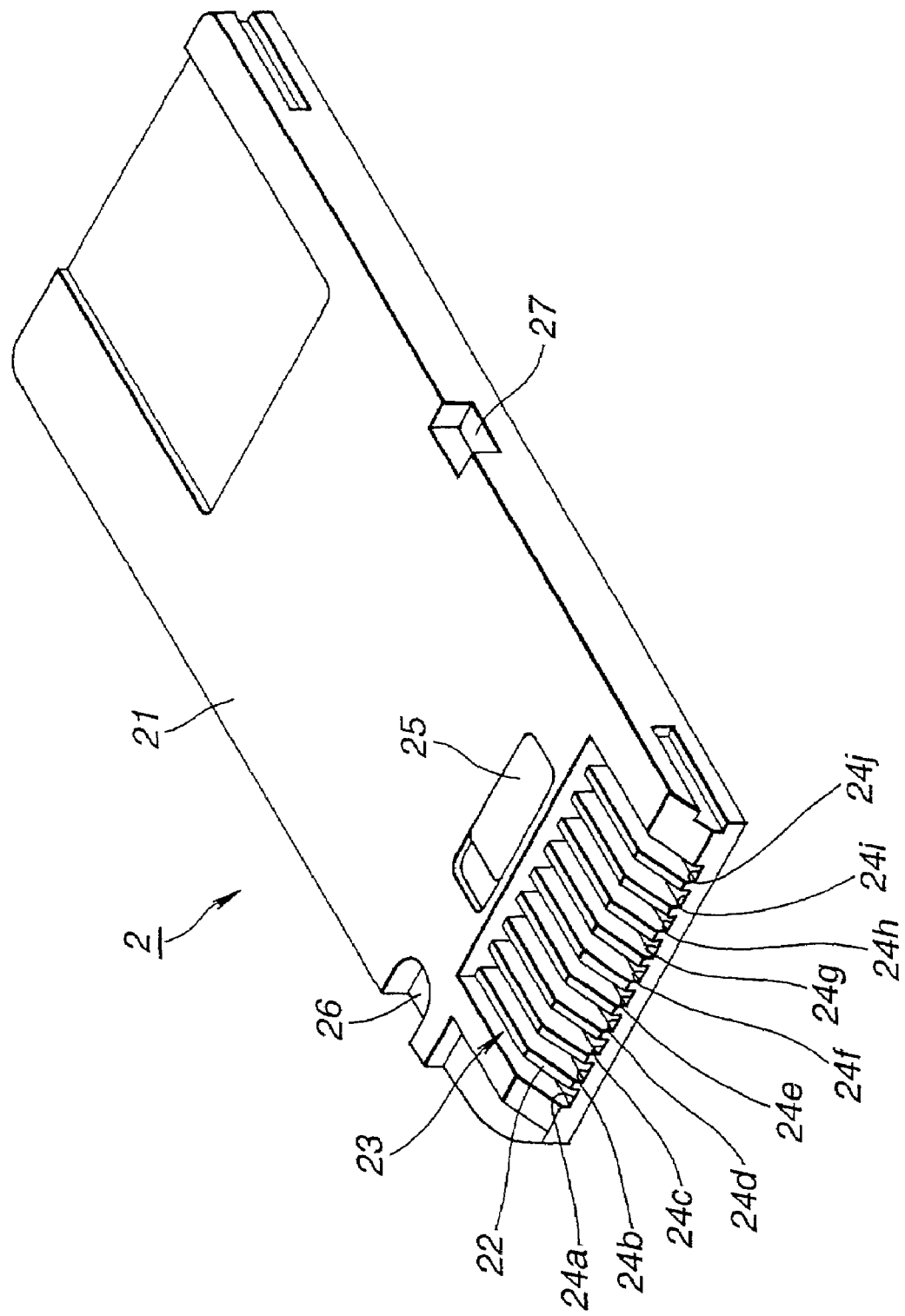
FIG. 3 is a perspective view showing the shape of the memory card to which the present invention is applied.

Note that the memory card 2 shown in FIG. 3 is an example of the external storage apparatus to which the present invention is applied. That is, the present invention does not depend on the shape of the external storage apparatus. The present invention may be applied to any one of external storage apparatuses regardless of the shape of the external storage apparatus.

The structure of a storage region of the flash memory 12 which is loaded into the memory card 2 will now be described. Note that the structure of the storage region which will now be described is an example of the structure of the storage region of the external storage apparatus to which the present invention is applied.

The present invention may widely be applied to a variety of external storage apparatuses of a type having a structure that the storage region is divided into a plurality of blocks which are units for data erase and a boot block in which boot data is stored is provided. The structure of the storage region is not limited to the following structure.

Figure 4:
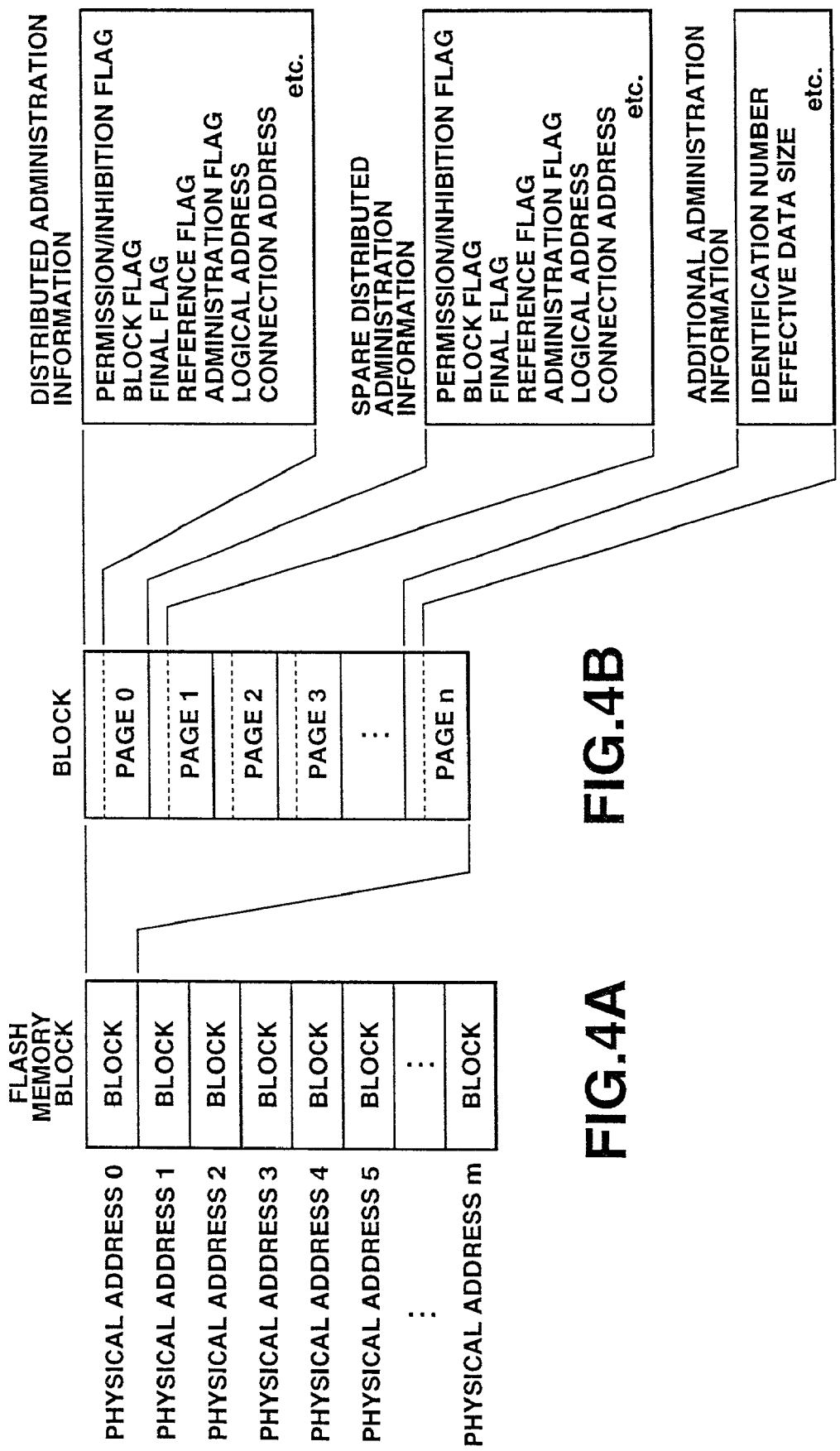
FIGS. 4A, 4B and 4C are diagrams showing the structure of a storage region of the memory card to which the present invention is applied.

As shown in FIG. 4A, the storage region of the flash memory 12 is divided into a plurality of blocks which are units for erasing data. The blocks consist of the boot block for storing boot data which is data arranged to initially be read by the data processing apparatus 1 when the memory card 2 has been booted up; and a data block on which arbitrary data is written. Each block has specific physical address. The blocks are units for erasing data and a minimum unit for managing a file. That is, a file is stored in one or more blocks. Therefore, one block cannot be used by a plurality of files.

Each boot block is composed of a plurality of bits each of which can be brought to either of two states which are a state "1" and a state "0". In an initial state, all bits are in the state of "1". Therefore, change of a bit unit is permitted from only "1" to "0". That is, when data composed of "1" and "0" is written, bits corresponding to "1" are maintained and bits corresponding to "0" are changed from "1" to "0".

When written data is erased, each block unit is collectively subjected to an initializing process so that all of bits in the foregoing block are made to be "1". As a result, data written on the block are collectively erased. Therefore, the data can again be written on the foregoing block.

Note that the present invention may be applied to any one of flash memories (so-called multi-value flash memories) of a type in which each bit can be brought to any one of three or more states as well as the flash memories (so-called binary-type flash memories) in which each bit can be brought to only two states.

Each block of the flash memory 12 is, as shown in FIG. 4B, composed of a plurality of pages which are units for writing or reading data. That is, when data is written on the flash memory 12, data transmitted from the page buffer 15 in page units is, in page units, written on the flash memory 12 by the flash memory interface sequencer 14. When data is read from the flash memory 12, the flash memory interface sequencer 14 reads data in page units so as to transmit data to the page buffer 15.

Each page has a data area and a redundant area. The data area is a region on which arbitrary data is written. The redundant area is a region in which information required to manage data, which is written on the data area, is stored.

Specifically, so-called distributed administration information is stored in the redundant area on the leading page of the block as information required to administrate the block, as shown in FIG. 4C. Also distributed administration information which is the same as that stored in the redundant area of the leading end page is, as spare distributed administration information, stored in the redundant area of pages from a second page of the block. Note that so-called additional administration information is, in place of distributed administration information, stored in the redundant area of a final page as additional information which cannot be administrated by only distributed administration information.

As described above, distributed administration information is stored in the redundant area of each block in the foregoing flash memory 12. Distributed administration information is information for administrating the block in which distributed administration information has been stored. In accordance with distributed administration information, for example, information indicating whether or not the foregoing block is a block which is the leading end of the file and information indicating connection of blocks when the file is composed of the plural blocks can be obtained. Distributed administration information will be described later.

Distributed administration information of the blocks in the memory card 2 are collected so that collective administration information is produced which serves as information for administrating the overall structure of the flash memory. Then, collective administration information is stored in the flash memory 12 as a file.

Usually, collective administration information is used to obtain information required to make an access to each block. That is, when data is communicated between the data processing apparatus 1 and the memory card 2, the data processing apparatus 1 reads collective administration information from the memory card 2 to develop the same in the internal memory 4. In accordance with collective administration information, the data processing apparatus 1 makes an access to the memory card 2. As a result, the necessity of making an access to the distributed administration information stored in each block can be eliminated. Thus, higher speed data access is permitted.

Distributed administration information, additional administration information and collective administration information will now be described.

Figure 5:
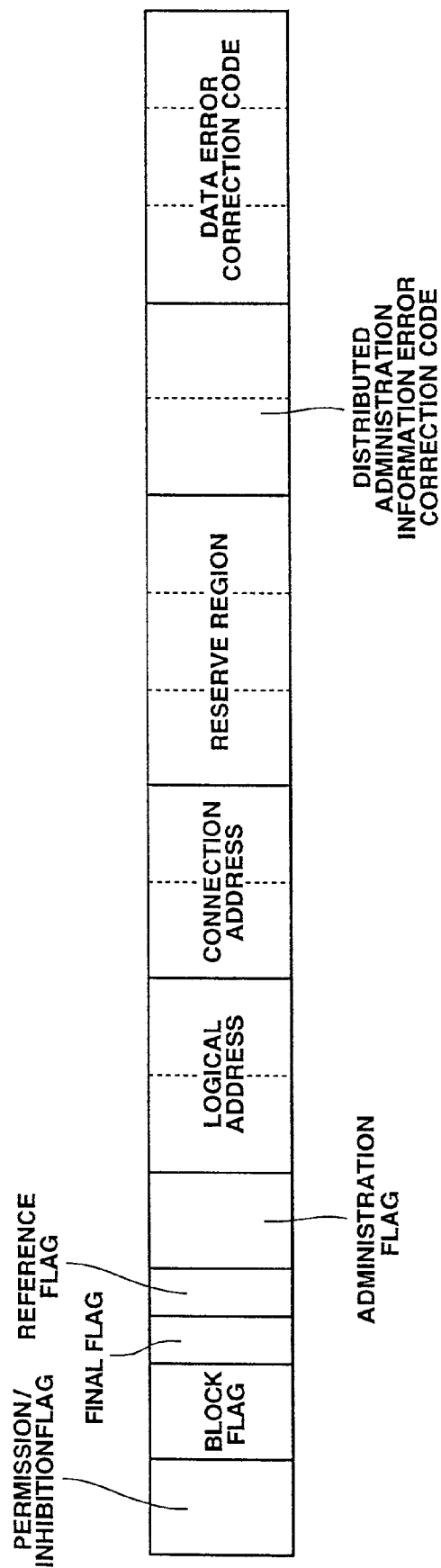
FIG. 5 is a diagram showing the structure of distributed administration information.

Distributed administration information is information for administrating the block in which distributed administration information has been stored, the distributed administration information being written on a 16-byte redundant area. Specifically, the distributed administration information is, as shown in FIG. 5, composed of a 1-byte permission/inhibition flag, a 1-byte block flag, a 4-bit final flag, a 4-bit reference flag, a 1-byte administration flag, a 2-byte logical address, a 2-byte connection address, a 3-byte reserve region, a 2-byte distributed administration information error correction code and a 3-byte data error correction code.

The permission/inhibition flag is a flag indicating whether the block is in a use-permitted state or a use-inhibited state. Specifically, the permission/inhibition flag is able to indicate either of two states which are "use permitted" and "use inhibited". The "use permitted" indicates a state in which the block can be used, while the "use inhibited" indicates that the block cannot be used. If unrecoverable error is made in the block, the permission/inhibition flag is set to be "use inhibited" so that use of the block is inhibited.

The block flag is a flag indicating the state of the block. Specifically, the block flag indicates any one of four states which are "non-use", "use at leading end", "use" and "non-erase". The "non-use" indicates a state in which the block is in a non-used state or data has been erased from the block. Thus, the block in the state of "non-use" is in an initial state (all of bits are "1") in which data can immediately be written. The "use at leading end" indicates a state in which the block is used at the leading end of the file. In a boot block having the boot data stored therein, the block flag is in the state "use at leading end". The "use" indicates a state in which the block is used in a portion except for the leading end. When the block flag is in the state "use", the block is connected to another block. The "non-erase" indicates a state in which data written on the block becomes unnecessary. When data is, for example, erased, the block flag is initially brought to the state "non-erase". If long processing time is permitted, the blocks having the block flags each of which is in the "non-erase" state are erased. As a result, an erasing process can effectively be performed.

The final flag is a flag indicating whether or not the file has been ended. Specifically, the final flag indicates either of "block continued" or "block ended". The "block continued" indicates a state in which the block is connected to a next block. That is, the "block continued" indicates that the file stored in the block has a following portion and thus the file is continued to another block. The "block ended" indicates that the block is the end block. That is, the "block ended" indicates that the file stored in the block is ended in this block.

The reference flag is a flag for instructing a reference of additional administration information. Specifically, the reference flag indicates either of two states which are "no reference information" and "reference information exists". The "no reference information" indicates that effective additional administration information does not exist in a redundant region on the final page of the block. The "reference information exists" indicates that effective additional administration information exists in the redundant region on the final page of the block.

The administration flag is a flag indicating the attribute of the block. The administration flag indicates, for example, whether the block is a read only block or a block which also permits writing. The administration flag also indicates that the block is a boot block or a data block.

The logical address indicates the logical address of the block in its literal sense. The value of the logical address is updated as necessary when data is rewritten. The value of the logical address is set in such a manner that the value of the logical address is not simultaneously possessed by a plurality of blocks.

The connection address is a logical address of a block connected to the block. That is, the file stored in the block has a following portion. If the file is continued to another block, a value of a logical address of a next block in which the following portion of the file has been stored is set to the connection address.

The distributed administration information error correction code is an error correction code for correcting the administration flag, the logical address, the connection address and data written on the reserve region among distributed administration information. Note that each of the permission/inhibition flag, the block flag, the final flag and the reference flag is not corrected by the distributed administration information error correction code. Therefore, the permission/inhibition flag, the block flag, the final flag and the reference flag can be rewritten without a necessity of updating the distributed administration information error correction code.

The data error correction code is an error correction code for correcting data written on a data area of a page in which the data error correction code has been stored.

The distributed administration information error correction code and the data error correction code are used by the error correction circuit 16 included in the memory card 2. Therefore, error correction using the error correction code does not depend on the data processing apparatus 1 and an arbitrary method depending on the memory card 2 may be employed.

Additional administration information is information stored in the 16-byte redundant area on the final page of the block and containing additional information which cannot be administrated only by distributed administration information.

Figure 6:
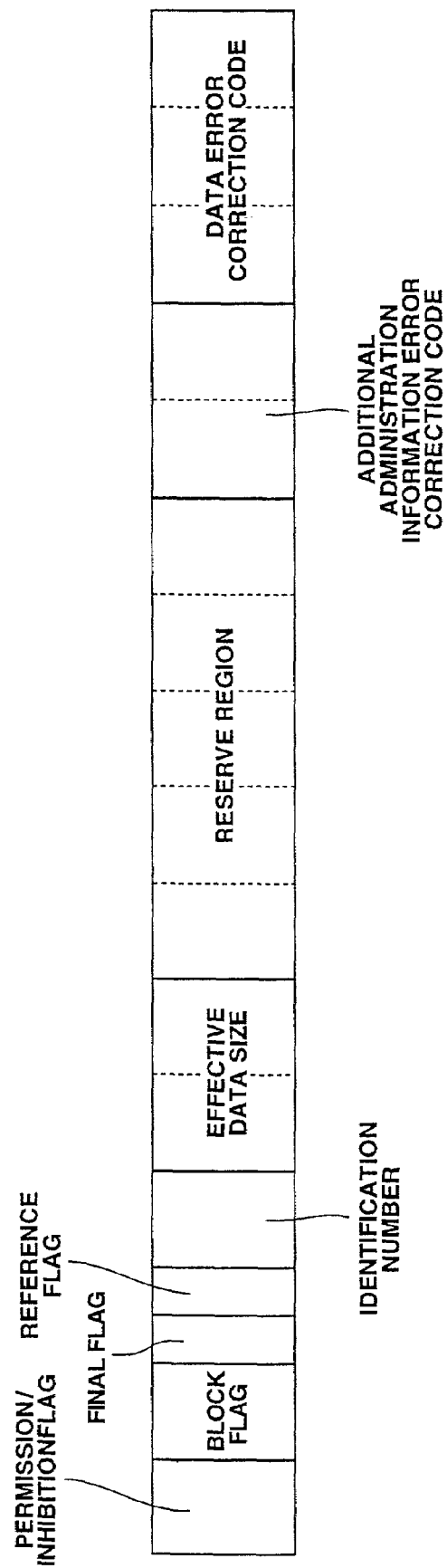
FIG. 6 is a diagram showing the structure of additional administration information.

Specifically, additional administration information is, as shown in FIG. 6, composed of a 1-byte permission/inhibition flag, a 1-byte block flag, a 4-bit final flag, a 4-bit reference flag, a 1-byte identification number, a 2-byte effective data size, a 5-byte reserve region, a 2-byte additional administration information error correction code and a 3-byte data error correction code.

The permission/inhibition flag, the block flag, the final flag, the reference flag, the reserve region and data error correction code are arranged similarly to those of the distributed administration information. The additional administration information error correction code corresponds to the distributed administration information error correction code of distributed administration information. The additional administration information error correction code is an error correction code for correcting the identification number, the effective size and the reserve region among additional administration information.

The identification number and the effective data size are included in additional administration information as additional information which cannot be administrated by only distributed administration information.

The identification number is information for performing an error solving process, the value of the identification number being incremented whenever data in the block is rewritten. If an error is made and thus a plurality of blocks having the same logical address exist, the identification number is used to determine whether data written on the block is new or old. A 1-byte region is used by the identification number, the value of the identification number being "0" to "255". The initial value of the identification number is "0". If the identification number is made to be larger than "255", the value is returned to "0". If a plurality of data blocks having the same logical address exist, a data block having the identification number, the value of which is smaller, is made to be effective. If a plurality of boot blocks having the same logical address exist as described later, a boot block having the identification number, the number of which is larger, is made to be effective.

The effective data size is the size of effective data in the block. That is, if the data area of the block has a blank portion, a value indicating the size of data written on the data area is set as the effective data size. At this time, the reference flag in distributed administration information is set to be "reference information exists". If the data area of the block has no blank portion, "0xffff" is set to the effective data size as a value indicating that the data area has no blank portion.

Distributed administration information and additional administration information above are always updated to be latest information whenever data in the block is updated.

Figure 7:
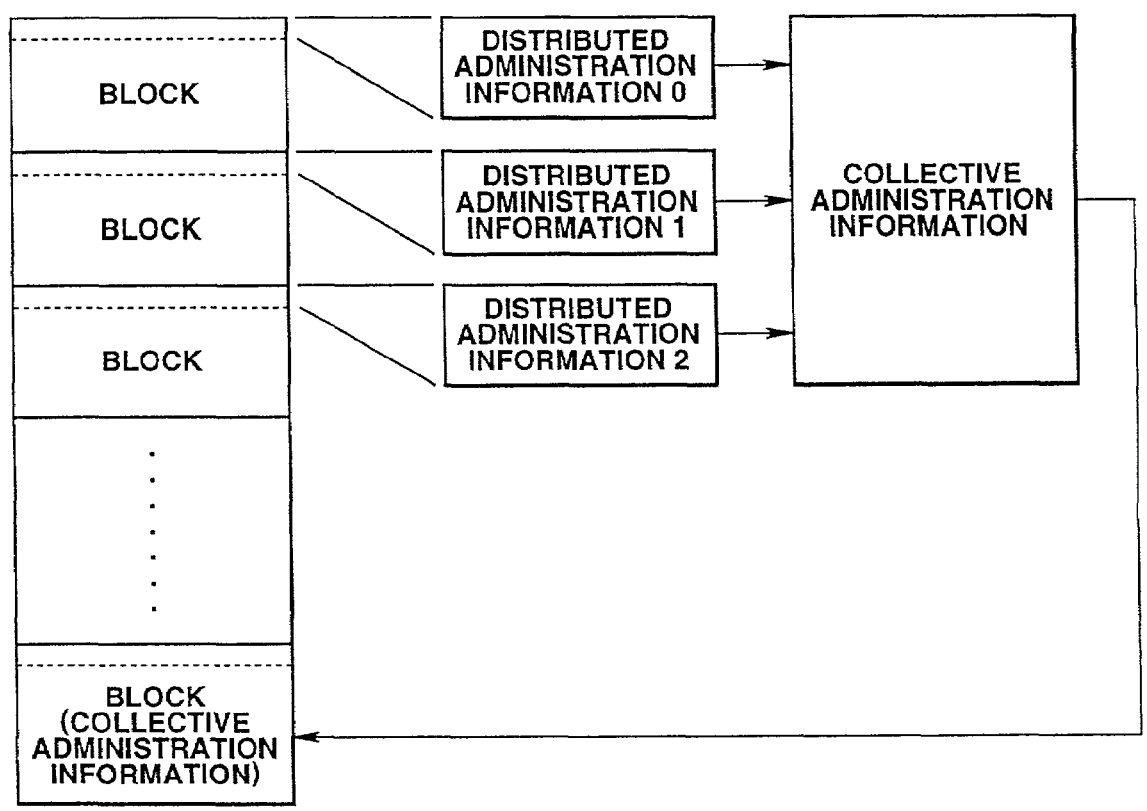
FIG. 7 is a diagram showing a state in which collective administration information is constituted from distributed administration information of each block.

Collective administration information is information produced by collecting distributed administration information of each of the blocks, the collective administration information being stored in the flash memory 12 as a file. That is, as shown in FIG. 7, a file of collective administration information, which is information for collectively administrating all blocks, is produced from distributed administration information of each block. Collective administration information is stored in a data area of a predetermined block. Note that collective administration information may be stored in one block or a plurality of blocks. The data processing apparatus 1 usually obtains information required to make an access to each block in accordance with collective administration information.

When the memory card 2 is booted up, boot data is initially read from the boot block by the data processing apparatus 1. Boot data includes a physical address of the block which has been instructed and in which collective administration information is stored. Therefor, the data processing apparatus 1 reads collective administration information stored in the block corresponding to the physical address to develop collective administration information in the internal memory 4. In accordance with collective administration information, the data processing apparatus 1 makes an access to the memory card 2. If collective administration information cannot normally be read from the flash memory 12, the data processing apparatus 1 reads distributed administration information of all of the blocks to reconstitute collective administration information so as to use collective administration information.

Whenever data is rewritten, the data processing apparatus 1, as the need arises, updates collective administration information developed in the internal memory 4 in such a manner that collective administration information is consistent with the actual state of the flash memory 12 (that is, the collective administration information is consistent with the contents of distributed administration information). On the other hand, collective administration information stored in the flash memory 12 as a file is not updated whenever rewriting of data or the like is performed. The contents of collective administration information are collectively updated at appropriate timing. The appropriate timing is, for example, a moment of time before power supply is interrupted, a moment of time at which no access to the memory card 2 is made for a period of time longer than a predetermined time or a moment at which rewriting of data is performed not smaller than predetermined number of times.

In general, the number of times permitted for the flash memory 12 to rewrite data has an upper limit. When rewriting of collective administration information stored in the flash memory 12 as a file is somewhat collectively performed, the number of rewriting times of the block in which collective administration information has been stored can be reduced. Thus, the lifetime of the memory card 2 can be elongated.

The process of the boot block which is an essential portion of the present invention will now be described.

Boot data is data which is first read by the data processing apparatus 1 when the memory card 2 has been booted up. Boot data contains information required to make an access to the memory card 2. Therefore, if an error is made in the boot block in which boot data has been stored and thus boot data cannot normally be read, the access to the memory card 2 cannot be made. Thus, the boot block must have satisfactory reliability.

Accordingly, the memory card 2 according to the present invention has a structure that boot data is always stored in two effective blocks at the leading end of the flash memory 12. Note that the "effective blocks" are blocks in a use-permitted state. That is, the "effective blocks" are blocks having the permission/inhibition flag set to "use permitted". That is, when boot data is stored in the block, ineffective blocks (that is, blocks each having the permission/inhibition flag set to "use inhibited") are not used and skipped. Thus, boot data is stored in the effective blocks so that boot blocks are generated.

As described above, the memory card 2 according to the present invention has the structure that a fixed and specific block is not made to be the boot block. If an ineffective block is made, the block for storing boot data is changed. Thus, boot data is always stored in two effective blocks. That is, even if an error is made in the leading end block, boot data is always stored double in two effective blocks. Therefore, the reliability of the memory card 2 according to the present invention can significantly be improved.

Moreover, the memory card 2 according to the present invention has a structure that the identification number included in additional administration information is used differently between a case of data block and a case of a boot block.

In the case of the data block, if a plurality of blocks having the same logical address exist, new or old of data stored in the blocks is identified by using the identification number.

The reason why a plurality of data blocks having the same logical address exist mainly lies in that an error is made when the data block is updated. At this time, data stored in the data block having the identification number, the number of which is smaller, is data before updating. Therefore, if a plurality of data blocks having the same logical address exist, the data block having the identification number, the number of which is smaller, is selected so that a state before data is updated is restored. Thus, data stored in the foregoing data block is employed as effective data.

The identification number of the data block is initialized to "0" when a logical address is newly assigned to the data block. The identification number is incremented by one when the data block is updated. As described above, if the identification number exceeds "255", the identification number is returned to "0".

In the case of the boot block, the identification number is, as described above, used to identify new or old of the boot data stored in the two effective blocks at the leading end of the flash memory 12. Boot data is information required to make an access to the memory card 2. Therefore, latest information must be employed. If the identification numbers of the two boot blocks are different from each other, an error is usually made when the boot block is updated. Boot data stored in the boot block having an identification number, the value of which is large, is boot data containing newer information. If two boot blocks have different identification numbers, the boot block having the identification number, the value of which is larger, is selected so that data stored in the foregoing boot block is employed as boot data.

The memory card 2 is formatted when it is used at first. When the formatting operation is performed, the identification number of the boot block is initialized to "0". The identification number is incremented by one when boot data stored in the boot block is updated. Also in the case of the boot block, if the identification number exceeds "255", it is returned to "0", similarly to the data block.

A procedure for making the two effective blocks at the leading end of the flash memory 12 to be the boot blocks and administrating new or old of the boot block by using the identification number will now be described.

(1) Procedure of Formatting Process

As described above, the memory card 2 according to the present invention is formatted when it is initially used. When the formatting process is performed, the boot block is generated. Therefore, a procedure for generating the boot block when the formatting process is performed will now be described.

When the formatting process is performed, the data processing apparatus 1 initially reads information stored in the configuration ROM 18 of the memory card 2. In accordance with read information and so forth, the data processing apparatus 1 produces data (that is, boot data) which is stored in the boot block. To cause read data to be recognized as boot data, information (hereinafter called a "boot identifier") indicating that read data is boot data is included in data which must be stored in the boot block.

Then, Produced boot data is written on each of the two leading end blocks of the flash memory 12 (that is, in a block having the smallest physical address value and a block having a second physical address value) so that a boot block and a spare boot block are generated. At this time, the identification number of additional administration information of the block on which boot data above is written is set to be "0". If the process is completed without any error, the process for producing the boot block is completed.

Specifically, the process for writing boot data is performed such that the subject block is initially subjected to the erasing process. Then, boot data is written on the foregoing block. If the subject block cannot normally be subjected to the erasing process or if boot data cannot normally be written on the block subjected to the erasing process, the permission/inhibition flag of the foregoing block is set to be "use inhibited". Thus, use of the foregoing block is inhibited. If the permission/inhibition flag cannot be set to be the "use inhibited", the process for setting the permission/inhibition flag to be the "use inhibited" is retried several times. If setting cannot be performed even after the plural retrial processes, the data processing apparatus 1 determines that the media is abnormal. Thus, the data processing apparatus 1 does not receive the memory card 2.

If an error is made in the block attempted to be the boot block, the memory card 2 according to the present invention tries to similarly write boot data on a block which can be used. The memory card 2 continues the foregoing process until two normal boot block having the same contents are produced. As a result, boot data having the same contents are respectively stored in the two leading end blocks of the flash memory 12. Thus, the two effective blocks at the leading end are made to be a boot block and a spare boot block.

The process for writing boot data is interrupted if the physical address of the subject block reaches a predetermined value M even in a case where two boot blocks having the same contents have not been produced. The predetermined value M is a value made to be adaptable to the characteristics of the flash memory 12 and the like. When the physical address of the subject block has reached the predetermined value M, the process for producing the boot block is interrupted even if only one boot block has been produced. Even if the physical address of the subject block has reached the predetermined value M and if no boot block is produced, a determination is made that the media is abnormal. Thus, the data processing apparatus 1 does not receive the memory card 2.

In general, the flash memory 12 has a high possibility that an error is made in a block which is subjected to rewriting process many times. If an error is made, there is apprehension that errors are made afterwards. Therefore, the block which has been used as a boot block and the use of which has been inhibited because of an error, the block is not used again even if the error is a temporary error. Since the above-mentioned rule is employed, boot data which is very important information is stored in a block having further satisfactory reliability. Thus, the reliability of the boot block can be improved. Note that the above-mentioned rule is applied to only a region from the leading end block to the second boot block or to only a region to a block having the physical address which reaches the above-mentioned predetermined value M if the second boot block does not exist. That is, the above-mentioned rule is applied to only boot blocks which must have satisfactory reliability and application of the same is inhibited to the following blocks (that is, the data blocks). As a result, the storage region can furthermore effectively be used.

(2) Procedure for Updating Boot Block

Boot data is not always the same data. When the memory card 2 is used, the contents of boot data must be changed. Therefore, the boot block is sometimes updated so as to rewrite boot data. The process for rewriting boot data is performed in accordance with the following rule.

When boot data is rewritten, the contents of collective administration information must be changed. Therefore, collective administration information stored in the flash memory 12 as a file is made to be ineffective before boot data is rewritten. When collective administration information is used next, reconstitution from distributed administration information is performed.

When the contents of boot data are rewritten, the boot block in which boot data has been stored is subjected to the erasing process whereby new boot data is written on the foregoing block. That is, when boot data is rewritten, the contents of the same block are updated without using another block. If an error is made when the process for updating the boot block is performed and use of the foregoing block is inhibited, the foregoing process is not performed.

When the process for rewriting to new boot data is performed, one of the two produced boot blocks that has a smaller physical address is subjected to the process. At this time, the identification number of the boot block having the contents which have been updated is incremented by one. If the value of the identification number before the rewriting operation is "255", the value is made to be "0".

When the spare boot block (that is, the boot block having a larger physical address) is updated and thus the process for rewriting boot data to new boot data to make the contents to be same as those of the other boot block has been performed, the identification number of the spare boot block is made to be the same value as that of the identification number of the other boot block.

A procedure for updating the boot block in accordance with the above-mentioned rule will now be described with reference to FIG. 8.

In an example shown in FIG. 8, a block having the physical address "1" is a boot block which is used usually (hereinafter called a "first boot block") and a block having the physical address "2" is the spare boot block (hereinafter called a "second boot block"). In the example shown in FIG. 8, a state in which boot data has normally been written and boot data can be read is indicated as "OK". A state in which boot data cannot be read because, for example, the process for rewriting boot data is being performed is indicated as "NG".

Figure 8A:
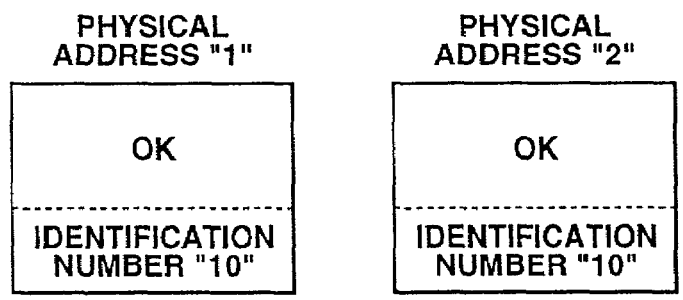
FIGS. 8A–8E are diagrams showing a procedure for updating a boot block.

FIG. 8A shows a normal state before the process for rewriting the boot block is performed. At this time, the identification number of the first boot block and that of the second boot block have the same value. Specifically, in the example shown in FIG. 8A, the identification number of the first boot block is "10" and also the identification number of the second boot block is "10".

Figure 8B:
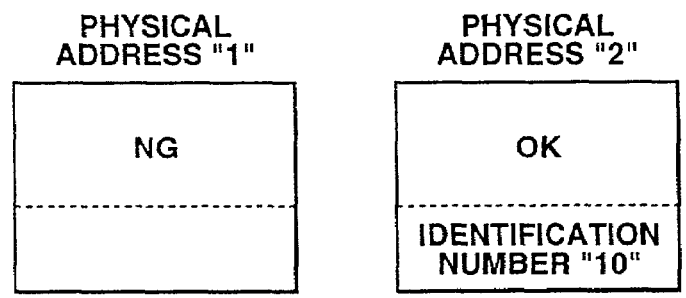

When the boot block is updated, the boot block having a smaller physical address, that is, the first boot block is subjected to the process for rewriting boot data, as shown in FIG. 8B. Since the first boot block is in the process for rewriting boot data, the first boot block is brought to the "NG" state in which the first boot block cannot be used as a boot block.

If the memory card 2 is forcibly removed from the data processing apparatus 1 or if the process is interrupted in the above-mentioned state, the first boot block cannot be used as a boot block when restart is performed. In the foregoing case, boot data stored in the second boot block which is the spare boot block is read so that the memory card 2 is booted up. In the foregoing case, the first boot block is reconstituted in accordance with boot data read from the second boot block.

Figure 8C:
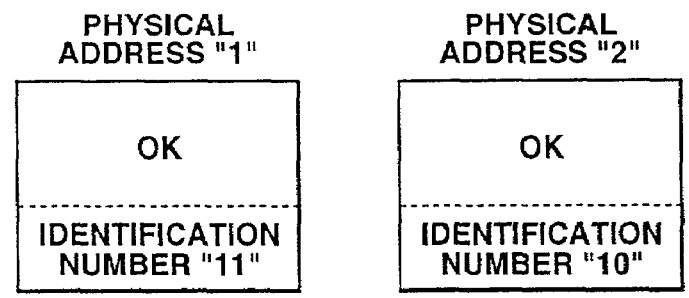

When the first boot block has been updated, the identification number of the first boot block is incremented by one, as shown in FIG. 8C. In this embodiment, the value of the identification number is made to be "11". In the foregoing state, new boot data is stored in the first boot block and old boot data is stored in the second boot block.

When the process is interrupted in the foregoing case because of, for example, forcible removal of the memory card 2 from the data processing apparatus 1, new boot data stored in the first boot block (that is, boot data stored in the boot block having the larger identification number) is read when restart is performed. Thus, the memory card 2 is booted up. At this time, boot data stored in the boot block having the identification number, the value of which is smaller (that is, the second boot block), is updated in accordance with boot data stored in the boot block (that is, the first boot block) having the identification number, the value of which is larger.

Figure 8D:
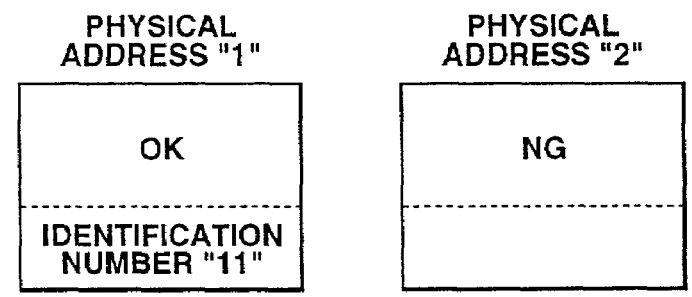

When the process for updating the first boot block has been completed, the boot block having the larger physical address, that is, the second boot block is updated, as shown in FIG. 8D. At this time, the second boot block is brought to the "NG" state in which it cannot be used as the boot block because boot data is being rewritten.

If the process is interrupted at this time because of, for example, forcible removable of the memory card 2 from the data processing apparatus 1, boot data in the first boot block is used so that the restart is performed to boot up the memory card 2. However, a state is realized in which no spare boot block exists. Therefore, the second boot block, which is the spare boot block, is reconstituted at this time in accordance with boot data read from the first boot block.

Figure 8E:
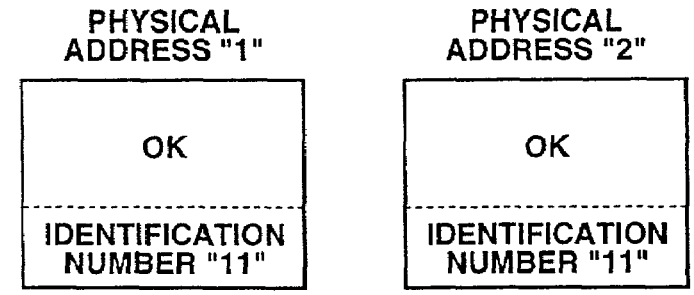

When the second boot block has been updated, the identification number of the second boot block is incremented by one, as shown in FIG. 8E. In this embodiment the value of the identification number is made to be "11". As a result, the identification number of the first boot block and that of the second boot block have the same value. As a result of the above-mentioned process, both of the first and second boot blocks are brought to the state in which new boot block has been stored.

(3) Procedure for Reading Boot Block When Memory Card is Booted Up

Boot data stored in the boot block is first read by the data processing apparatus 1 when the memory card 2 has been connected to the data processing apparatus 1 and the same has been booted up. A procedure for reading the boot block by the data processing apparatus 1 when the memory card is booted up will now be described.

In a normal state, two boot blocks exist which having the same identification number and the same contents. Therefore, a process for confirming the above-mentioned fact is always performed when the memory card is booted up. Specifically, the following process is performed in the sequential order starting at the leading end block so as to examine the boot block.

Whether or not distributed administration information of the leading end page can normally be read is confirmed.

Whether or not the permission/inhibition flag has been brought to the "use permitted" state is confirmed.

Whether or not the block flag has been brought to the "use at leading end" is confirmed.

The boot identifier is detected so as to confirm whether or not stored data is boot data.

Whether or not additional administration information stored on the final page can normally be read is confirmed.

The identification number is read. In the case of the first boot block, the value of the identification number of the first boot block is stored. In the case of the second boot block, whether or not the identification number of the second boot block coincides with that of the first boot block is confirmed.

Data in the boot block is read. In the case of the first boot block, read data is stored. In the case of the second boot block, whether or not read data and stored data of the first boot block coincide with each other is confirmed.

The above-mentioned process is performed such that the process starts at the leading end block. When two boot blocks having the same identification number and the same contents have been confirmed, the operation for reading the boot blocks is completed. As described above, two boot blocks are confirmed when the memory card 2 is booted up so that the reliability of the memory card 2 is significantly improved.

If only one boot block exists after examination has been continued until the physical address reaches the predetermined value M, boot data stored in the boot block is used to boot the memory card 2 up. If a usable block exists among the leading end block to the M-th block, boot data is written on the usable block. Thus, a new spare boot block is produced. If no usable block exists from the leading end block to the M-th block, the memory card 2 is operated in the state in which only one boot block exists. If no boot block exist after examination has been continued to the M-th block, the data processing apparatus 1 determines that the media is abnormal. Thus, the data processing apparatus 1 does not receive the memory card 2.

If the identification numbers are different from each other even in a state in which boot data has normally been written on two blocks, the block having the large identification number is selected as a valid boot block. When the memory card 2 is booted up, boot data stored in the block having the larger identification number is used. If the identification number of either of the two blocks is "255" and that of the other block is "0", the block having the identification number "0" is selected as a valid boot block. Thus, boot data in the valid boot block is used. If boot data is normally written on only one block, the foregoing block is used as the boot block.

A further detailed procedure for reading the boot block when the memory card is booted up will now be described with reference to a flow chart shown in FIGS. 9 to 12. In this embodiment, variables I, WB, IDA and IDB are employed. The variables I and WB are those to each of which the physical address is input, while the variables IDA and IDB are those to each of which the value of the identification number is input.

When the memory card is booted up, "0" is input to the variable I in step S1. Moreover, "0" is input to each of the variables IDA and IDB. Then, the operation proceeds to step S2.

In step S2 the block, which must be processed, is made to be a block having the physical address indicated with the variable I. Then, the operation proceeds to step S3.

In step S3 whether or not distributed administration information can be read from the block which must be processed is determined. If distributed administration information can be read, the operation proceeds to step S4. If distributed administration information cannot be read, the operation proceeds to step S25.

In step S4 whether or not the permission/inhibition flag of the block which must be processed is brought to the "use permitted" state is determined. If the state is the "use permitted" state, the operation proceeds to step S5. If the state is not the "use permitted" state, the operation proceeds to step S22.

In step S5 whether or not the block flag of the block which must be processed is the "use at leading end" is determined. If the state is the "use at leading end", the operation proceeds to step S6. If the state is not the "use at leading end", the operation proceeds to step S24.

In step S6 whether or not a boot identifier has been provided to data stored in the block which must be processed is determined. That is, whether or not data above is boot data is determined. If data above is boot data, the operation proceeds to step S7. If data above is not boot data, the operation proceeds to step S28.

In step S7 whether or not additional administration information can be read from the block which must be processed is determined. If additional administration information can be read, the operation proceeds to step S8. If additional administration information cannot be read, the operation proceeds to step S25.

In step S8 the value of the identification number of the block which must be processed is substituted for the variable IDA. Then, the operation proceeds to step S9.

In step S9 whether or not boot data can be read from the block which must be processed is determined. If boot data can be read, the operation proceeds to step S10. If boot data cannot be read, the operation proceeds to step S25.

In step S10 boot data is read from the block which must be processed so as to store read boot data. Then, the operation proceeds to step S11.

In step S11 the value of the variable I is substituted for the variable WB and the value of the variable I is incremented by one. Then, the operation proceeds to step S12 shown in FIG. 10.

In step S12 the block which must be processed is made to be the block having the physical address indicated with the variable I. Then, the operation proceeds to step S13.

In step S13 whether or not distributed administration information can be read from the block which must be processed is determined. If distributed administration information can be read, the operation proceeds to step S14. If distributed administration information cannot be read, the operation proceeds to step S32.

In step S14 whether or not the permission/inhibition flag of the block which must be processed is in the "use permitted" state is determined. If the state is the "use permitted" state, the operation proceeds to step S15. If the state is not the "use permitted" state, the operation proceeds to step S29.

In step S15 whether or not the block flag of the block which must be processed is in the "use at leading end" is determined. If the state is the "use at leading end" state, the operation proceeds to step S16. If the state is not the "use at leading end", the operation proceeds to step S31.

In step S16 whether or not a boot identifier has been provided for data stored in the block which must be processed is determined. That is, whether or not data above is boot data is determined. If data above is boot data, the operation proceeds to step S17. If data above is not boot data, the operation proceeds to step S35.

In step S17 whether or not additional administration information can be read from the block which must be processed is determined. If additional administration information can be read, the operation proceeds to step S18. If additional administration information cannot be read, the operation proceeds to step S32.

In step S18 the value of the identification number of the block which must be processed is substituted for the variable IDB. Then, the operation proceeds to step S19.

In step S19 the values of the variable IDA and IDB are compared with each other. If the values of the variables IDA and IDB are the same, the operation proceeds to step S20. If the values of the variables IDA and IDB are the same, the operation proceeds to step S32.

In step S20 whether or not boot data can be read from the block which must be processed is determined. If boot data can be read, the operation proceeds to step S21. If boot data cannot be read, the operation proceeds to step S32.

In step S21 boot data is read from the block which must be processed. Then, whether or not read boot data and boot data which has been read and stored coincide with each other is determined. The boot data items coincide with each other when reading of boot data from the two boot blocks has normally been performed. Therefore, the process is completed here. If boot data items do not coincide with each other, the operation proceeds to step S32.

Figure 9:
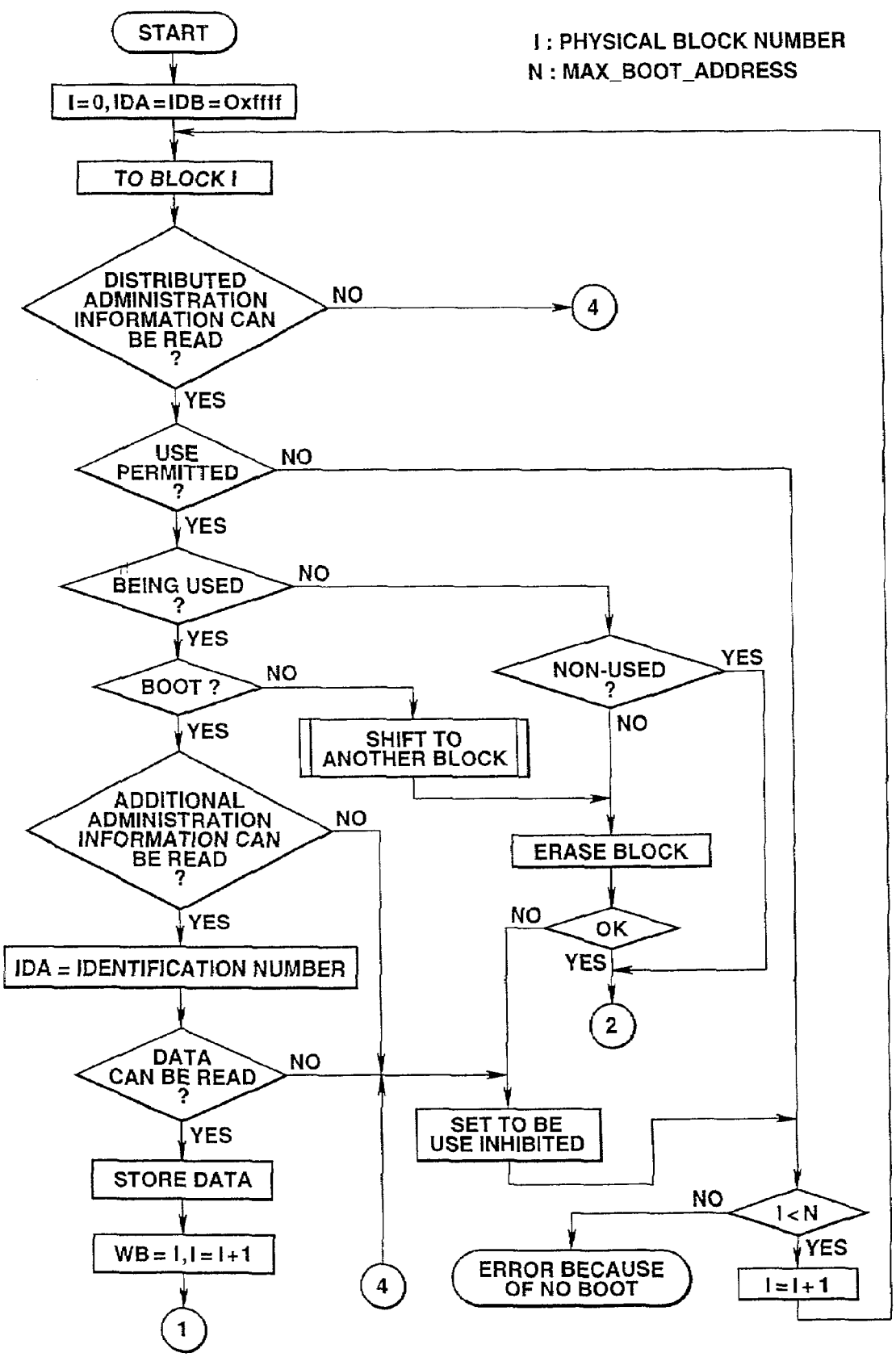
FIG. 9 is a flow chart showing a procedure for reading the boot block when the memory card is booted up.

If the permission/inhibition flag is not the "use permitted" state in step S4 as shown in FIG. 9, the operation proceeds to step S22, as described above.

In step S22 the value of the variable I and the predetermined value M are compared with each other. If the value of the variable I is smaller than the predetermined value M, the operation proceeds to step S23. The value of the variable I is not smaller than the predetermined value M in step S22 if boot data cannot be obtained after examination has been performed to the M-th block. In this case, a determination as an error is made and the process is ended.

In step S23 the value of the variable I is incremented by one. Then, the operation is returned to step S2 and the process is repeated.

If the block flag is not brought to the "use at leading end" in step S5, the operation proceeds to step S24, as described above. In step S24 whether or not the foregoing block flag has been brought to the "non-use" state is determined. If the state is the "non-use" state, the operation proceeds to step S36 shown in FIG. 11. If the state is not the "non-use" state, the operation proceeds to step S25.

In step S25 the block which must be processed is subjected to the erasing process. Then, the operation proceeds to step S26.

In step S26 whether or not the erasing process in step S25 has normally been completed is determined. If the erasing process has normally been completed, the operation proceeds to step S36 shown in FIG. 11. If the erasing process has normally been completed, the operation proceeds to step S27.

In step S27 the permission/inhibition flag of the block which must be processed is set to be the "use inhibited" state. Then, the operation proceeds to step S22 so that the foregoing process is performed.

If data is not boot data in step S6, the operation proceeds to step S28, as described above.

In step S28 the block which must be processed is shifted to another block. Then, the operation proceeds to step S25 so that the foregoing process is performed.

If distributed administration information cannot be read in step S3, if additional administration information cannot be read in step S7 or if boot data cannot be read in step S9, also the operation proceeds to step S25 so that the above-mentioned process is performed.

Figure 10:
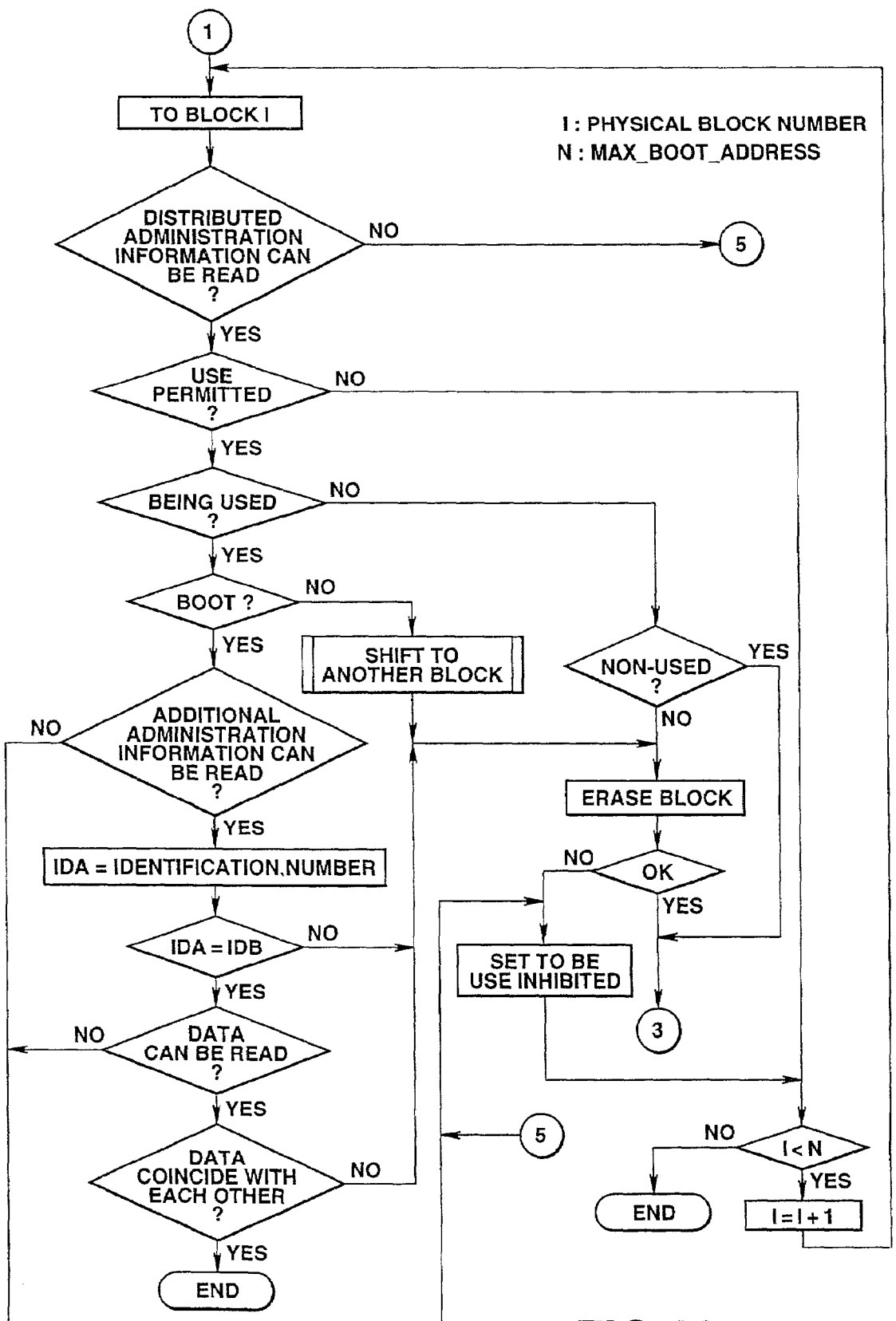
FIG. 10 is a flow chart showing a procedure for reading the boot block when the memory card is booted up.

If the permission/inhibition flag is not brought to the "use permitted" state in step S14 as shown in FIG. 10, the operation proceeds to step S29, as described above. In step S29 the value of the variable I and the predetermined value M are compared with each other. If the value of the variable I is smaller than the predetermined value M, the operation proceeds to step S30. The value of the variable I is not smaller than the predetermined value M in step S29 when second boot data cannot be obtained after examination to the M-th block has been performed. In this case, the process for reading boot data is interrupted. Boot data which has been read and stored is used to boot the memory card 2 up.

In step S30 the value of the variable I is incremented by one. Then, the operation is returned to step S12 so that the process is repeated.

If the block flag is not the "use at leading end" state in step S15, the operation proceeds to step S31, as described above. In step S31 whether or not the foregoing block flag is the "non-use" state is determined. If the state is the "non-use" state, the operation proceeds to step S47 shown in FIG. 12. If the state is not the "non-use" state, the operation proceeds to step S32.

In step S32 the block which must be processed is subjected to the erasing process. Then, the operation proceeds to step S33.

In step S33 whether or not the erasing process has normally been completed in step S32 is determined. If the erasing process has normally been completed, the operation proceeds to step S47 shown in FIG. 12. If the erasing process has not normally been completed, the operation proceeds to step S34.

In step S34 the permission/inhibition flag of the block which must be processed is set to be the "use inhibited" state. Then, the operation proceeds to step S29 so that the foregoing process is performed.

If data is not boot data in step S16, the operation proceeds to step S35, as described above. In step S35 the block which must be processed is shifted to another block. Then, the operation proceeds to step S32 so that the foregoing process is performed.

If distributed administration information cannot be read in step S13, if additional administration information cannot be read in step S17, if the value of the variable IDA and that of the variable IDB do not coincide with each other in step S19, if boot data cannot be read in step S20 or if boot data items do not coincide with each other in step S21, the operation proceeds to step S32 as described above so that the foregoing process is performed.

Figure 11:
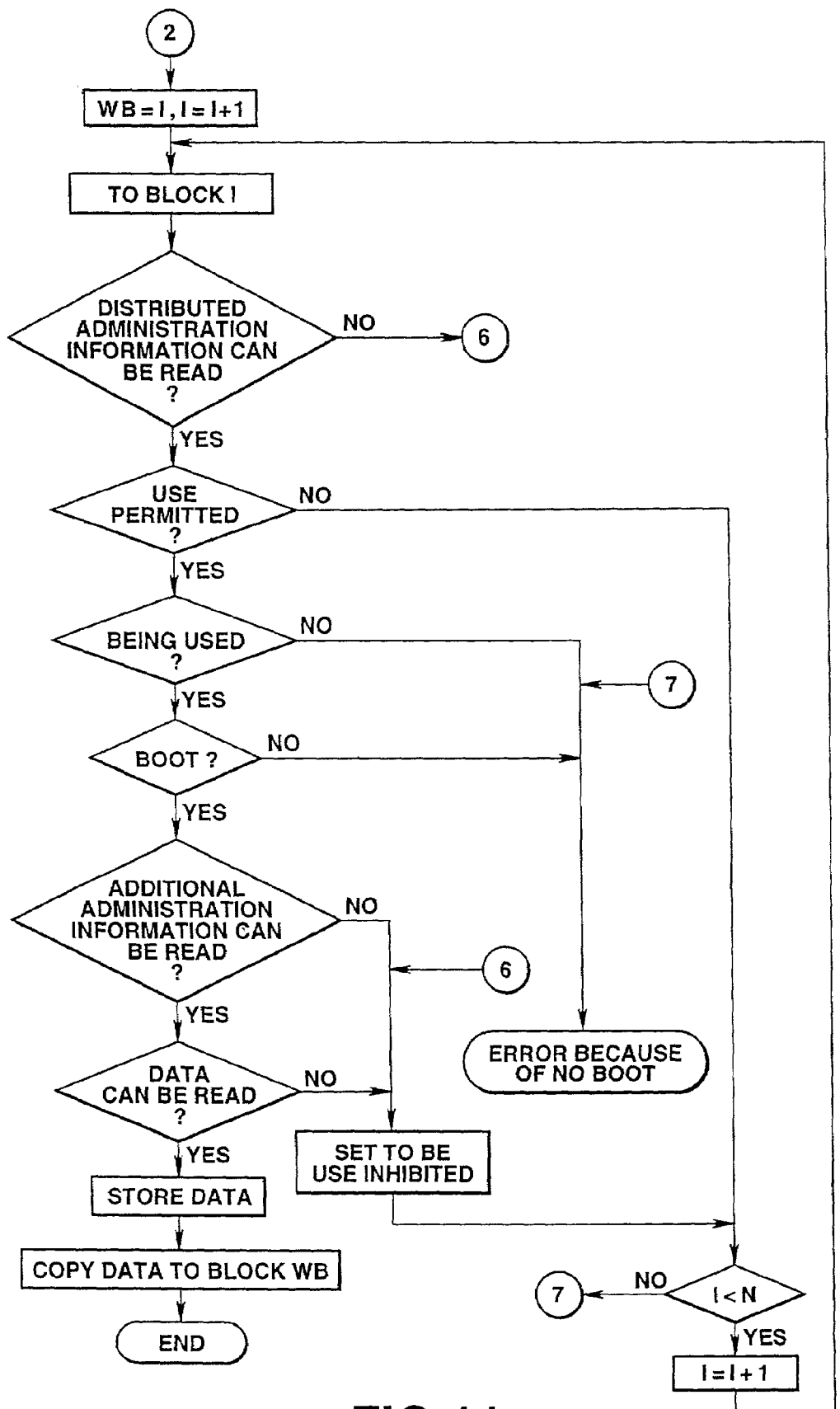
FIG. 11 is a flow chart showing a procedure for reading the boot block when the memory card is booted up.

As shown in FIG. 11, the value of the variable I is substituted for the variable WB in step S36. Moreover, the value of the variable I is incremented. Then, the operation proceeds to step S37.

In step S37 the block which must be processed is made to be the block having the physical address indicated with the variable I. Then, the operation proceeds to step S38.

In step S38 whether or not distributed administration information can be read from the block which must be processed is determined. If distributed administration information can be read, the operation proceeds to step S39. If distributed administration information cannot be read, the operation proceeds to step S45.

In step S39 whether or not the permission/inhibition flag of the block which must be processed is in the "use permitted" state is determined. If the state is the "use permitted" state, the operation proceeds to step S40. If the state is not the "use permitted" state, the operation proceeds to step S45.

In step S40 whether or not a block identifier has been provided for data stored in the boot block which must be processed is determined. That is, whether or not data above is boot data is determined. If data above is boot data, the operation proceeds to step S41.

In step S41 whether or not additional administration information can be read from the block which must be processed is determined. If additional administration information can be read, the operation proceeds to step S42.

In step S42 whether or not boot data can be read from the block which must be processed is determined. If boot data can be read, the operation proceeds to step S43.

In step S43 boot data is read from the block which must be processed so that read boot data is stored. Then, the operation proceeds to step S44.

In step S44 boot data read and stored in step S43 is written on the block having the physical address indicated with the variable WB. At this time, the process for reading boot data is interrupted. Then, boot data read and stored in step S43 is used to boot the memory card 2 up.

If distributed administration information cannot be read in step S38 or if the permission/inhibition flag is in the "use permitted" state in step S39, the operation proceeds to step S45, as described above. In step S45 the value of the variable I and the predetermined value M are compared with each other. If the value of the variable I is smaller than the predetermined value M, the operation proceeds to step S46. The value of the variable I is made to be not smaller than the predetermined value M when boot data cannot be obtained after examination has been performed to the M-th block. In this case, a determination as an error is performed and the process is completed.

In step S46 the value of the variable I is incremented by one. Then, the operation is returned to step S37 so that the process is repeated.

If data is not boot data in step S40, if additional administration information cannot be read in step S41 or if boot data cannot be read in step S42, a determination as an error is performed and the process is completed. The foregoing case occurs when boot data cannot be read from either of the two boot blocks.

Figure 12:
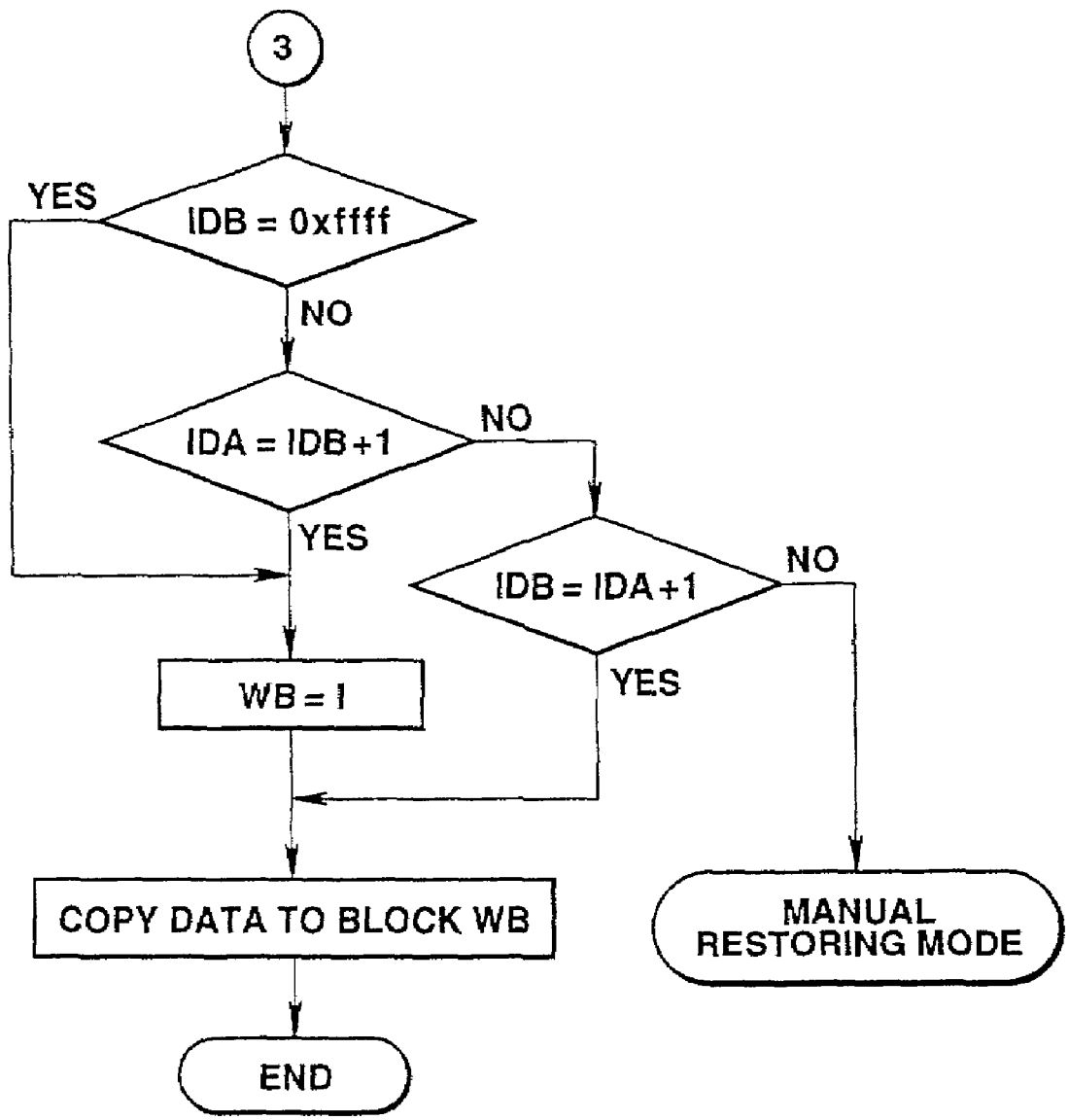
FIG. 12 is a flow chart showing a procedure for reading the boot block when the memory card is booted up.

As shown in FIG. 12, whether or not the value of the variable IDB is "0xffff" is determined in step S47. If the value of the variable IDB is not "0xffff", the operation proceeds to step S48. If the value of the variable IDB is "0xffff", the operation proceeds to step S49.

In step S48 the value of the variable IDA and a value obtained by adding "1" to the value of the variable IDB are compared with each other. If the two values are the same, the operation proceeds to step S49. If the two values are not the same, the operation proceeds to step S51.

In step S49 the value of the variable I is substituted for the variable WB. Then, the operation proceeds to step S50.

In step S50 boot data which has been read and stored is written on the block having the physical address indicated with the variable WB. At this time, the process for reading boot data is completed and boot data which has been read and stored is used to boot the memory card 2 up.

In step S51 the value of the variable IDB and a value obtained by adding "1" to the value of the variable IDA are compared with each other. If the two values are the same, the operation proceeds to step S50 so that the foregoing process is performed.

The value of the variable IDB and the value obtained by adding "1" to the value of the variable IDA are not the same in step S51 when the identification numbers of the two boot blocks are not same and when the identification numbers are not sequential numbers. Since reading of boot data can be performed, a manual restoring mode is employed such that the data processing apparatus 1 performs an appropriate process.

Thus, the process for reading the boot block is performed when the memory card is booted up. By performing the above-mentioned process, two boot blocks are confirmed when the memory card 2 is booted up. Therefore, the reliability of the memory card 2 can significantly be improved.

As described above, according to the present invention, boot data is stored in each of a plurality of different blocks. Therefore, even if a block in which boot data has been stored cannot be used, boot data stored in another block can be used to boot the external storage apparatus up.

Since the identification number indicating new or old of boot data is stored in the block, latest boot data can always be used. That is, according to the present invention, even if a state in which new boot data and old boot data exist in a mixed manner is realized, latest boot data can always be used. Therefore, the consistency of data can be maintained.

Therefore, according to the present invention, occurrence of an error can satisfactorily be prevented when boot data is read. Thus, a reliable external storage apparatus can be provided.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An external storage apparatus comprising: a plurality of blocks of erasable data;
   a first boot block for storing boot data which is first read when the apparatus is booted up; and,
   a second boot block for storing redundant boot data;
   wherein an identification number is stored in each of said first and second boot blocks;
   said identification number being a first value when the boot data in the respective boot block is new boot data, and a second value when the boot data in the respective boot block is old boot data.

2. The external storage apparatus of claim 1 wherein said plurality of blocks of erasable data and said first and second boot blocks are flash memory data blocks.

3. The external storage apparatus of claim 1, wherein the latest boot data among boot data stored in the first and second boot blocks is read in accordance with the identification number when said external storage apparatus is booted up so that said external storage apparatus is booted up by using the latest boot data.

4. The external storage apparatus of claim 1, wherein whether each boot data stored in the plurality of the different blocks is new or old is determined in accordance with the identification number when said external storage apparatus is booted up, and boot data is rewritten to latest boot data when it is determined that old boot data exists.

5. A data processing method for use with a storage apparatus that stores data in erasable blocks, in which boot data is first read from a boot block of the storage apparatus when the storage apparatus is booted up, the method comprising the steps of:
   storing boot data in each of first and second boot blocks of the storage apparatus; and,
   storing an identification number in each of said first and second boot blocks;
   said identification number being a first value when the boot data in the respective boot block is new boot data, and a second value when the boot data in the respective boot block is old boot data.

6. The data processing method of claim 5, wherein when said external storage apparatus is booted up, latest boot data among boot data stored in the plurality of the different blocks is read in accordance with the identification number, and said external storage apparatus is booted up by using latest boot data.

7. The data processing method of claim 5, wherein when said external storage apparatus is booted up, whether boot data stored in the first and second boot blocks is new or old is determined in accordance with the identification number stored in the respective boot block, and old boot data is rewritten to latest boot data when old boot data exists.

8. A memory card removably insertable into a data processing apparatus that transfers data to and from said memory card, said memory card comprising: a plurality of blocks of erasable data;

a first hoot block for storing boot data which is first read when the apparatus is booted up; and
a second boot block for storing redundant boot data;
wherein an identification number is stored in each of said first and second boot blocks;
said identification number being a first value when the boot data in the respective boot block is new boot data, and a second value when the boot data in the respective boot block is old hoot data.

9. The memory card of claim 8 wherein said plurality of blocks of erasable data and said first and second boot blocks are flash memory data blocks.

* * * * *